April 9, 1929.　　　　W. S. HAMM　　　　1,708,133
VENTILATOR
Filed Dec. 29, 1924　　2 Sheets-Sheet 1

Inventor:
William S. Hamm
By Gillson, Manuff & Co.
Att'ys.

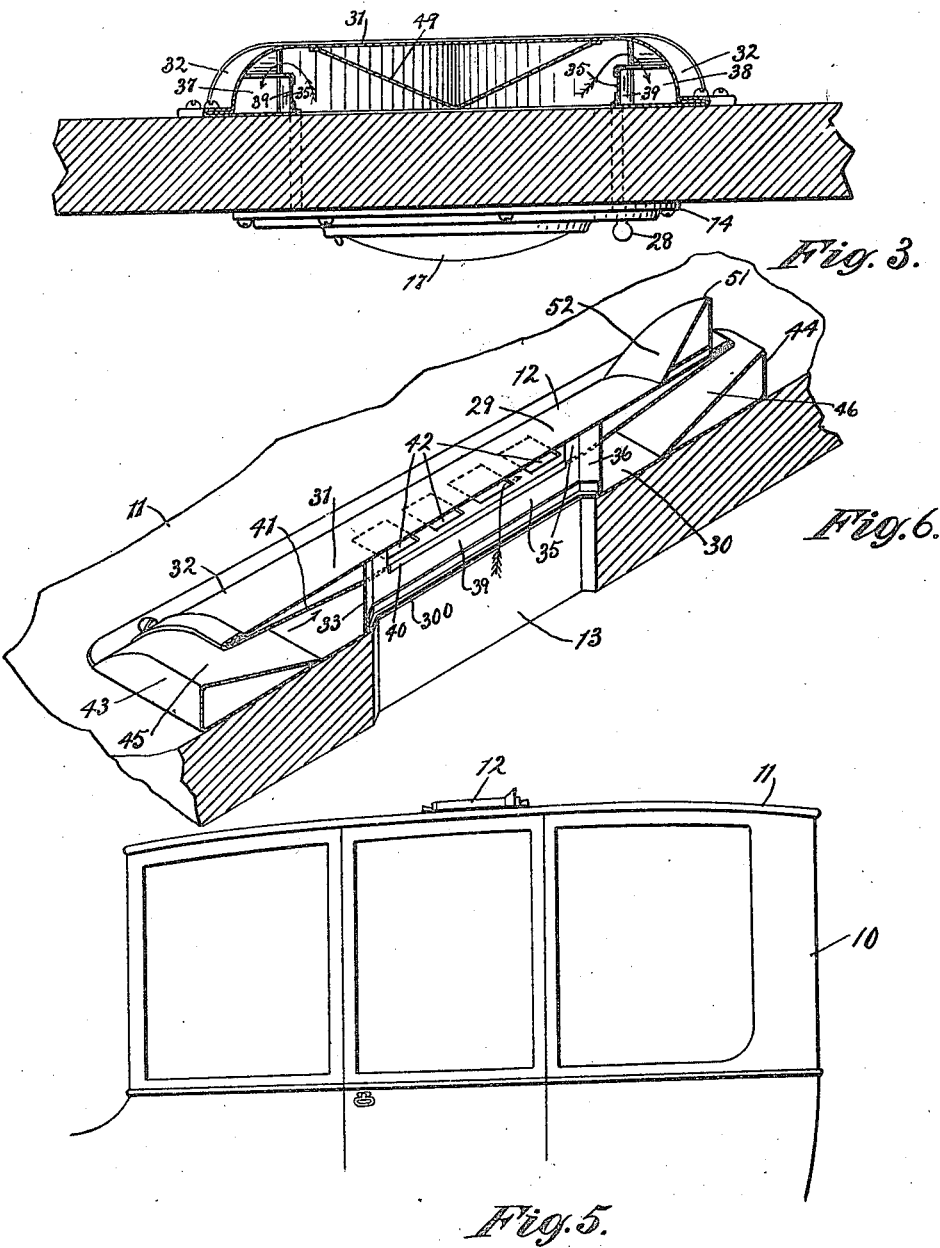

Patented Apr. 9, 1929.

1,708,133

UNITED STATES PATENT OFFICE.

WILLIAM S. HAMM, OF HUBBARD WOODS, ILLINOIS, ASSIGNOR TO THE ADLAKE COMPANY, OF CHICAGO, ILLINOIS, A CORPORATION OF ILLINOIS.

VENTILATOR.

Application filed December 29, 1924. Serial No. 758,550.

This invention relates to ventilators, and more particularly to ventilators for inclosures such as vehicle bodies and the like.

One of the objects of the invention is the provision of a new and improved ventilator having means for increasing its efficiency, that will also prevent the entrance of rain, snow and the like into the inclosure on which the ventilator is employed.

Another object of the invention is the provision of a new and improved ventilator that is inconspicuous when used on a vehicle body, and does not detract from the appearance of the vehicle top on which it is employed.

A still further object of the invention is the provision of a new and improved ventilator that is efficient in its operation whether the movement of the air is from the front or from the rear.

Other objects of the invention are the provision of a new and improved ventilator that is efficient in operation, simple in construction, easily applied, cheap to manufacture, and that is not likely to become broken, disassembled or get out of order.

Other and further objects and advantages of the invention will appear from the following description taken in connection with the accompanying drawings, in which Fig. 1 is a plan view of a portion of a vehicle body showing my invention in position thereon, with parts broken away;

Fig. 3 is a section on line 3—3 of Fig. 2;

Fig 5 is a side elevation of a portion of a vehicle showing the invention in position thereon; and Fig. 6 is a section on line 6—6 of Fig. 1.

Figure 1:
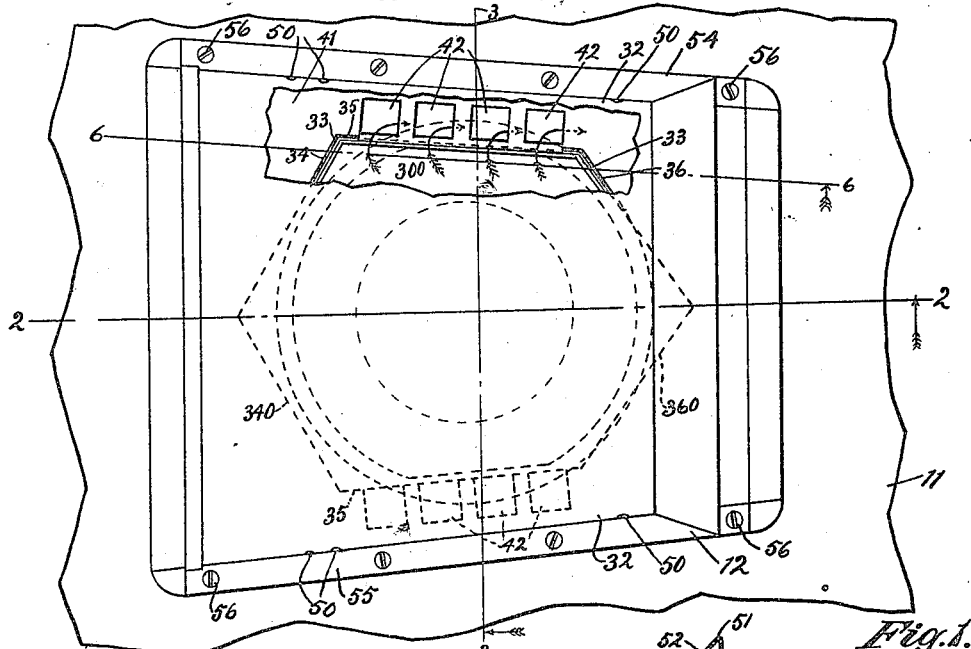
Figure 2:
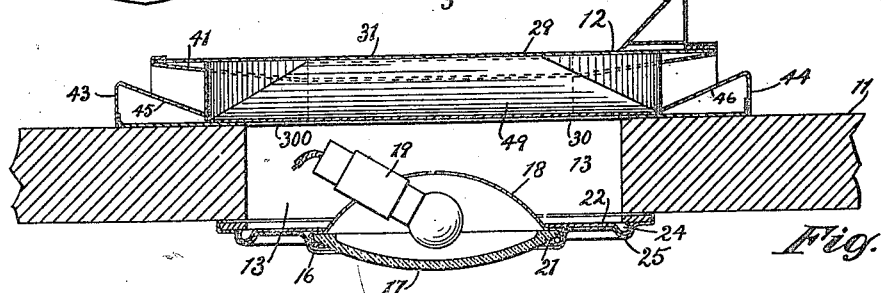
Fig. 2 is a section on line 2—2 of Fig. 1.
Figure 4:
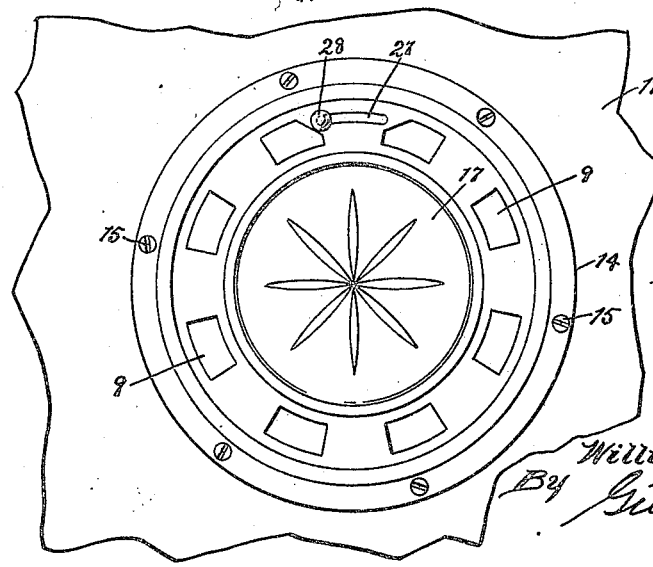
Fig. 4 is a bottom plan of a portion of the vehicle top showing a damper and light in position therein.

On the drawings, the reference character 10 designates an inclosure, here shown as being a body of an automobile, on the top 11 of which the ventilator 12 is mounted. While the ventilator is shown as being mounted on the top of the body 10 it is understood that it may be mounted on the sides or any other portion of the body 10 that is exposed to the passage of the air during the movement of the vehicle.

The vehicle top 11 is provided with an opening 13 over which the ventilator is secured. A lamp may be conveniently mounted in the opening on the under side of the top. A lamp support 14 provided with a series of openings 9 is secured to the under side of the top as by the fastening means 15. The support is provided with a central opening, and the edge of the support is offset to form a ledge 16 about said opening for supporting a glass dome 17. A concave reflector 18 carrying the socket 19 has its peripheral edge 21 bent to engage about the peripheral edge of said dome. An annular damper 22 having openings adapted to register with the openings 9 is provided with an annular bead 24 on its peripheral edge for engaging a corresponding recess 25 in said support. An operating knob for shifting the damper is shown at 28, the stem of the knob projecting and working in a slot 27 in the supporting plate 14.

While I have shown a light in connection with the opening it is understood that the same may be dispensed with if desired, it being only necessary that an opening be provided in the top 11 for the escape of air from the inclosure.

The ventilator may be and preferably is formed of sheet metal and comprises a casing 29 having top and side walls 31 and 32 respectively, the front and rear being open. The side walls preferably converge rearwardly as clearly shown in Fig. 1. The casing 29 may be and preferably is provided with a bottom wall 30, although it is understood that the bottom wall may be dispensed with entirely, the surface on which the device is attached performing the function of a bottom wall. The wall 30 has an opening 300 therethrough in alinement with the opening 13 in the top portion of the body.

Suitable means are provided for forming one or more narrow passages in the casing 29 for the passage of air therethrough. These passages may be formed in any suitable manner. As shown, an enclosure member 33 is mounted within the casing and is adapted to form with the side walls of said casing two air passages 37 and 38. The enclosure member 33 is in the form of an endless band or wall for enclosing the opening in the bottom of the casing 29. It may be of any suitable shape. In the form selected to illustrate one embodiment of the invention, the enclosure member 33 comprises the two front converging walls 34 and 340, the side walls 35 and the rear converging walls 36 and 360. The side walls 35 are arranged substantially parallel with the side walls 32 of the casing 29 thereby forming restricted passages 37 and 38. The front walls 34 and 340 may converge forwardly. The walls 36 and 360 converge rearwardly, thereby permitting an expansion and a consequent reduction of pressure of the columns of air passing through the restricted passages 37 and 38.

The walls of the enclosure are adapted to engage the top and bottom walls 31 and 30 of the casing 29. The sides 35 of the enclosure are provided with cutaway portions as at 40 forming walls 39 the upper edges of which are spaced from the top of the casing, see Figs. 3 and 6. A shield member 41 provided with an opening corresponding to the contour of the enclosure member 33 extends across the casing from end to end thereof and has its ends connected to the ends of the top wall 31 of the casing 29. The shield plate 41 is bent downwardly intermediate its ends to the level of the bottom of the notches in the walls 35, and forms the top walls of the passages 37 and 38.

A suitable number of openings 42 are provided in the walls of the passages 37 and 38, preferably above the plane of the bottom of said passages, so that they will always be above the level of water that may collect in the passages, thereby preventing the entrance of the same into the body of the vehicle. These openings are preferably made in the plate 41 and are adapted to permit air passing up through the opening 13 in the vehicle top to escape into the passages 37 and 38 as indicated by the arrows in Figs. 3 and 6.

While the above described construction will operate to remove the air from the car, it has been found by experiment that its efficiency is considerably increased by employing an upwardly extending deflector or shield member 43 which may, if desired, be braced with the rearwardly and downwardly extending inclined wall 45.

The deflector member 43 is preferably substantially vertical, and may be of less height than the casing, and is located slightly in advance of the front end of the casing. It has been found by experiment that the height and position of the deflector member 43 gives better results when its proportions and arrangement are that shown when used on ventilators having substantially the relative dimensions as that disclosed in the drawings. A deflector member 44 may also be mounted at the rear of the casing. The deflector member 44 is similar to the deflector member 43, is similarly located relative to the rear end of the casing and its function is substantially the same. The casing may be and preferably is provided with small apertures 50 at each corner adjacent to the lower ends of the inclined walls 45 and 46 whereby water entering the passages may escape. The deflector members 43 and 44 may be mounted on and secured to the extended ends of the bottom wall 30 of the casing 29, being properly braced by the inclined walls 45 and 46 respectively. The walls 45 and 46 being inclined, the air escaping from the passages 37 and 38 will tend to carry snow and the like up the incline and out of the casing, thereby preventing its accumulation in the casing. The deflector members prevent, to a certain extent, the entrance of snow, hail and the like into the casing and in addition tend to give the ventilator a finished appearance.

By the use of these deflector members the vehicle is ventilated whether the air passes along the casing from the front or from the rear. In other words, the ventilator may be said to be reversible. The ventilator will operate to remove the air from the vehicle while it is standing if the wind be blowing from any direction. Wind blowing from the side across the mouths of the openings in the ventilator has been found to have an aspirating effect to remove the air from the vehicle through the openings at both ends of the ventilator. The action is, of course, less vigorous than when the air blows from the rear or front.

In order to deflect the air escaping from the vehicle body into the passages 37 and 38 an air directing member 49 may be and preferably is employed. This member is preferably V-shape, with the apex on the longitudinal axis of the casing and with the ends secured to the top wall 31 thereof adjacent to the passages 37 and 38, whereby the air passing through the opening 13 of the top will be directed into said passages.

It has been found by experiment that the efficiency of the ventilator is very materially increased by providing means for creating a partial vacuum at the rear of the casing to facilitate the exit of the air from the passages 37 and 38. The external deflector member 51 is employed for this purpose. It is mounted on the casing at the rear end thereof and comprises an upwardly and rearwardly extending deflector wall 52 which when the vehicle is moving forwardly through the air will deflect the air passing along the top of the casing 29 upwardly and rearwardly, thereby causing a partial vacuum at the rear end of the casing which materially augment the the escape of air from the passages in said casing.

The ventilator is of high efficiency, and its operation, determined by tests made by creating a smudge within the body to which the device was applied and then passing an air blast, of varying intensity, across its top, is shown to be as follows:—The external air currents pass across the openings between the deflectors 43, 44, and the ends of the casing 29, and cause a suction from both ends of the passages 37, 38, which in turn draws air from the interior of the body to which the device is applied through the openings 13 and 42. The convergence of the end walls of the closure 33 enhances the suction applied to the passages 37, 38, by rendering effective the entire width of the device.

The ventilator 12 is a complete or unitary structure and is provided with apertured flanges 54 and 55 whereby it may be secured in position over a suitable ventilator opening in a vehicle body or other enclosure as by means of the screws 56.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:—

1. A ventilator comprising a casing having top, side and bottom walls, said bottom wall having an opening therein, an enclosure member extending about said opening and engaging the top and bottom walls of said casing, the side walls of said member and casing being spaced apart to form air passages at each side of said member, the side walls of said member having their upper portions cut away, and apertured top walls for said passages.

2. A ventilator for vehicles comprising a shallow box-like outer casing having a flat top and adapted to be seated on the roof of a vehicle and having its forward end open and an aperture in its bottom for communicating with the interior of the vehicle, a wall extending about said aperture, the front portion of said wall being attached to the top of said casing and the side portions thereof being cut away to provide openings, and a shield facing and spaced from the open end for obstructing the entrance of air currents thereinto.

3. A ventilator comprising a casing in the form of a shallow box-like structure adapted to be seated against the wall of a compartment to be ventilated and having an opening for communicating with the compartment, and an external lateral opening, a wall extending about said first-named opening and attached to the top of said casing at the front and rear thereof, and a shield facing the last-named opening for obstructing the entrance of air currents thereinto, the space between the shield and the casing being upwardly open.

4. A ventilator for vehicles comprising an outer casing approximately rectangular in cross section, its side walls being of less height than the width of its top, such casing having a flue passage opening thru its bottom and both of its ends, a wall extending about the flue passage in the bottom of said casing, said wall being attached to the top wall of said casing at the front thereof, and a wall facing and spaced from the end openings.

5. In a ventilator for vehicles, a casing in the form of a shallow box-like structure adapted to seat upon the roof of the vehicle and having an opening in its bottom, and an internal partition forming a passage opening through the end of the casing, said partition having a portion cut away to provide an opening therethrough, such passage having an opening above its bottom communicating with the opening in the casing bottom, and a shield facing the external opening of such passage to obstruct the entrance of air currents thereinto.

6. In a ventilator for vehicles, a casing in the form of a shallow box-like structure having a flue for communicating with the interior of the vehicle and discharging into the casing above the bottom thereof, a passage open externally through the ends of the casing and communicating with the flue at each side of said casing only, and shields facing the ends of the passage for obstructing the entrance of air currents thereinto.

7. A ventilator for vehicles comprising a casing having the form of a shallow oblong box having open ends and the end portions of its chamber externally open and having an aperture in its bottom, a wall inclosing the aperture and extending to the top of the casing having an aperture adjacent its upper end, such wall being imperforate below the last named aperture and shields facing and spaced from the open ends of the casing.

In testimony whereof I affix my signature.

WILLIAM S. HAMM.